United States Patent
Jay et al.

(10) Patent No.: US 6,400,683 B1
(45) Date of Patent: Jun. 4, 2002

(54) ADAPTIVE CLOCK RECOVERY IN ASYNCHRONOUS TRANSFER MODE NETWORKS

(75) Inventors: Alexandre Jay, Montreal (CA); Eric Saint Georges, Sscardale, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/301,820

(22) Filed: Apr. 29, 1999

(30) Foreign Application Priority Data

Apr. 30, 1998 (EP) .............................................. 98480026

(51) Int. Cl.⁷ .............................. H04L 12/56; H04J 3/06
(52) U.S. Cl. .................. 370/229; 370/395.62; 370/465; 370/516; 375/372
(58) Field of Search ................................. 370/229, 235, 370/395.62, 465, 503, 512; 375/371, 372; 709/233

(56) References Cited

U.S. PATENT DOCUMENTS 5,274,680 A * 12/1993 Sorton et al. ................ 370/253
5,452,010 A *  9/1995 Doornink ..................... 348/497

(List continued on next page.)

FOREIGN PATENT DOCUMENTS

| EP | 0443976 | 8/1991 |
| EP | W09805146 | 2/1998 |

OTHER PUBLICATIONS

Hara J E et al: "Neural Networks in Network Management" Annual Review of Communications, vol. 48, No. 11, Jan. 1, 1994, pp. 854–858, XP000543234 *p. 854, left–hand column, line 1–p. 855, right–hand column, line 48.

Elbaum R et al: "Topological Design of Local Area Networks Using Genetic Algorithms" Proceedings Infocom '95—Conference on Computer Communications, Fourteenth Annual Joint Conference of the IEEE Computer and Communications Societies, Boston Apr. 2–6, 1995, vol. 4, no. CONF. 14, Apr. 2, 1995, pp. 64–71, XP000580564 Institute of Electrical and Electronics Engineers *p. 64, left–hand column, line 1 p. 65. left–hand column, line 34 *p. 67, right–hand column, line 33–46.

*Primary Examiner*—Hassan Kizou
*Assistant Examiner*—David Odland
(74) *Attorney, Agent, or Firm*—Cesari and McKenna, LLP

(57) ABSTRACT

In a data communication network, a system clock rate can be inferred at a receiver by measuring the data rate during successive periods. This information is used to adjust or adapt a receiver output clock to the inferred system clock. To adapt a receiver buffer output clock frequency to the buffer input clock frequency, the level of the buffer is periodically monitored. If the fill level is greater than an upper threshold, the output clock frequency is incremented. If the fill level is less than a lower threshold, the output clock frequency is decremented. A count is maintained of the number of successive adjustment operations performed while the fill level is outside the range bounded by the thresholds. When the fill level returns to the bounded range, a number of reverse frequency adjustments are performed. The number of reverse frequency adjustments are less than the number of earlier opposite frequency adjustments, preferably by a factor of two. The reverse corrections converge the output clock frequency toward the input clock frequency, reducing oscillations.

4 Claims, 9 Drawing Sheets

U.S. PATENT DOCUMENTS

| | | | | |
|---|---|---|---|---|
| 5,526,362 A | * | 6/1996 | Thompson et al. | 370/516 |
| 5,742,649 A | | 4/1998 | Muntz et al. | |
| 5,790,538 A | * | 8/1998 | Sugar | 370/352 |
| 5,812,618 A | | 9/1998 | Muntz et al. | |
| 5,822,383 A | | 10/1998 | Muntz et al. | |
| 5,896,427 A | | 4/1999 | Muntz et al. | |
| 6,044,092 A | * | 3/2000 | Jayawardena et al. | 370/395.62 |
| 6,088,413 A | * | 7/2000 | Autry et al. | 370/506 |
| 6,111,878 A | * | 8/2000 | Powell | 370/252 |
| 6,157,652 A | * | 12/2000 | Henson et al. | 370/407 |
| 6,157,957 A | | 12/2000 | Berthaud | |
| 6,195,385 B1 | | 2/2001 | Aiyagari et al. | |
| 6,252,850 B1 | * | 6/2001 | Lauret | 370/235 |
| 6,259,677 B1 | | 7/2001 | Jain | |
| 6,292,834 B1 | * | 9/2001 | Ravi et al. | 709/216 |

\* cited by examiner

ADAPTIVE CLOCK RECOVERY IN ASYNCHRONOUS TRANSFER MODE NETWORKS

TECHNICAL FIELD

The present invention relates to data communications and more particularly, to an adaptive clock recovery method and system implemented at a receiving end point of a data connection.

BACKGROUND ART

In order to transport time-sensitive data over high speed asynchronous telecommunication networks, such as those based on Asynchronous Transfer Mode technology, it is necessary to adapt the data flow at the receiver with the data flow through the network. For the support of asynchronous CBR services with clocks not locked to a network clock, ITU recommendation I.363.1 provides two methods. A Synchronous Residual Time Stamp (SRTS) method is provided for those data services which must satisfy known jitter (also called Cell Delay Variation or CDV) and wander requirements. An adaptive clock method is provided for those services which must satisfy jitter but not wander requirements. The term "wander" is used to identify slow changes in clock rates which may occur over long periods of time due primarily to the effect of changing environmental conditions, such as rising or falling ambient temperatures, on clocking systems.

The Synchronous Residual Time Stamp (SRTS) method uses a Residual Time Stamp (RTS) to measure and convey information about the frequency difference between a common reference clock derived from the network and a service clock. The same derived network clock is assumed to be available at both the transmitting end and the receiving end. This Residual Time Stamp is transported across the network and used at the receiving end to reproduce the frequency difference.

The adaptive clock method is a general method for source clock frequency recovery performed at the receiving end of a connection. The method is based on the premise that the amount of data transmitted through the network is an indication of the system frequency. No explicit timing information is transported by the network. By averaging the amount of data received at the receiving end of a connection over a period of time, jitter effects are counteracted. The period of time used for averaging depends on the jitter characteristics of the connection.

One method of measuring the amount of data transmitted through the network over a given period of time (an observation period) is to measure the fill level of the receiver data buffer, sometimes called a PlayOut Buffer (POB), at the end of successive observation periods. The receiver writes received data into the buffer at an input frequency (sometimes referred to as a buffer source or just source frequency and then reads it out using a local (output) clock. The fill level of the buffer at the end of any given observation period depends on the fill level at the start of the time period and the difference between the input frequency and the local clock frequency during the time period.

According to known adaptive clock methods, no frequency corrections if the buffer fill level at the end of an observation period is between the upper and lower thresholds. If, however, the buffer fill level exceeds the upper threshold, the frequency of the local or output clock is increased by a predetermined amount. The local clock frequency will be repeatedly incremented by the same amount at the end of successive observation period as long as the buffer fill level exceeds the upper threshold. Eventually, the local clock frequency will become greater than the input clock frequency, causing the buffer to be emptied faster than it is filled. When the buffer fill level falls below the upper threshold, no further adjustments are made in the local clock frequency.

Similar control actions occur when the buffer fill level falls below the lower threshold, indicating that the local clock frequency is too high in comparison to the input clock frequency. Under those conditions, the local clock frequency is decremented by a fixed amount at the end of each observation period if the buffer fill level is below the lower threshold. When the local clock frequency is decremented to the point that it is lower than input frequency, the buffer will start to refill. When the buffer fill level once again exceeds the lower threshold, no further adjustments are made in the local clock frequency.

An adaptive clock method should continuously and rapidly converge the local clock frequency toward the frequency of the source (input) clock. One problem is that the prior art method described above is triggered only when the buffer fill level is found to be outside the upper and lower thresholds. No corrective actions are taken if the buffer fill level is between the two thresholds. This can lead to undesirable oscillations or delays in the converge of the input and local clock frequencies.

SUMMARY OF THE INVENTION

The present invention is an improved adaptive clock technique for use at a receiving system having a buffer to which data is written at a source frequency and from which data is read at a local clock frequency. The fill level of the buffer is measured at the end of successive observation periods. If the fill level is found to fall outside of predetermined threshold values, the local clock frequency is either increased or decreased depending on whether it is the upper threshold or the lower threshold that has been found to be exceeded. A count is maintained of the number of frequency adjustments that are performed before the buffer fill level returns to the range bounded by the two thresholds. The frequency adjustment actions are not, however, terminated simply because the buffer fill level returns to this range. A series of reverse frequency corrections are performed on the local clock once the buffer fill level returns to the range. For example, if the local clock frequency had been incremented several times to deal with a buffer filled beyond the upper threshold, the reverse frequency correction will result in the output frequency being decremented even after the buffer fill level falls below the upper threshold. The number of reverse corrections is less than the number of corrections previously made.

BRIEF DESCRIPTION OF THE DRAWINGS

Details of a preferred embodiment of the invention will be better understood from the following description and the accompanying drawings in which.

DESCRIPTION OF THE PREFERRED EMBODIMENT

The present invention is a clock recovery technique which can be used in any of a number of types of asynchronous networks in which timing information must be conveyed explicitly or implicitly from a data source to a data destination. Networks implementing Asynchronous Transfer Mode (ATM) technology may be the best example of the kind of network that can benefit from the invention.

Asynchronous Transfer Mode (ATM) is a telecommunication technology developed by the telecommunications (carrier) industry for handling computer data, audio (e.g., telephony) and video data in a single integrated data stream. All information is transported through the network in short, fixed length (48 data bytes plus a 5-byte header) blocks called "cells". Information flows along paths (called "virtual channels") set up as a series of pointers through the network. Cells on a particular virtual channel always follow the same path through the network and are delivered to the destination in the same order in which they are received.

Many types of user data are either continuous (e.g., voice and video) or are originally formatted into frames much longer that the 53 bytes allocated to each ATM cell. Consequently, user data must be segmented into cells at the edges of the network before being transported through the network. At the destination side of the network the user data must be reconstructed from the received cells. These adaptation functions are performed in an end point functional layer called an ATM Adaptation Layer (AAL).

Figure 1:
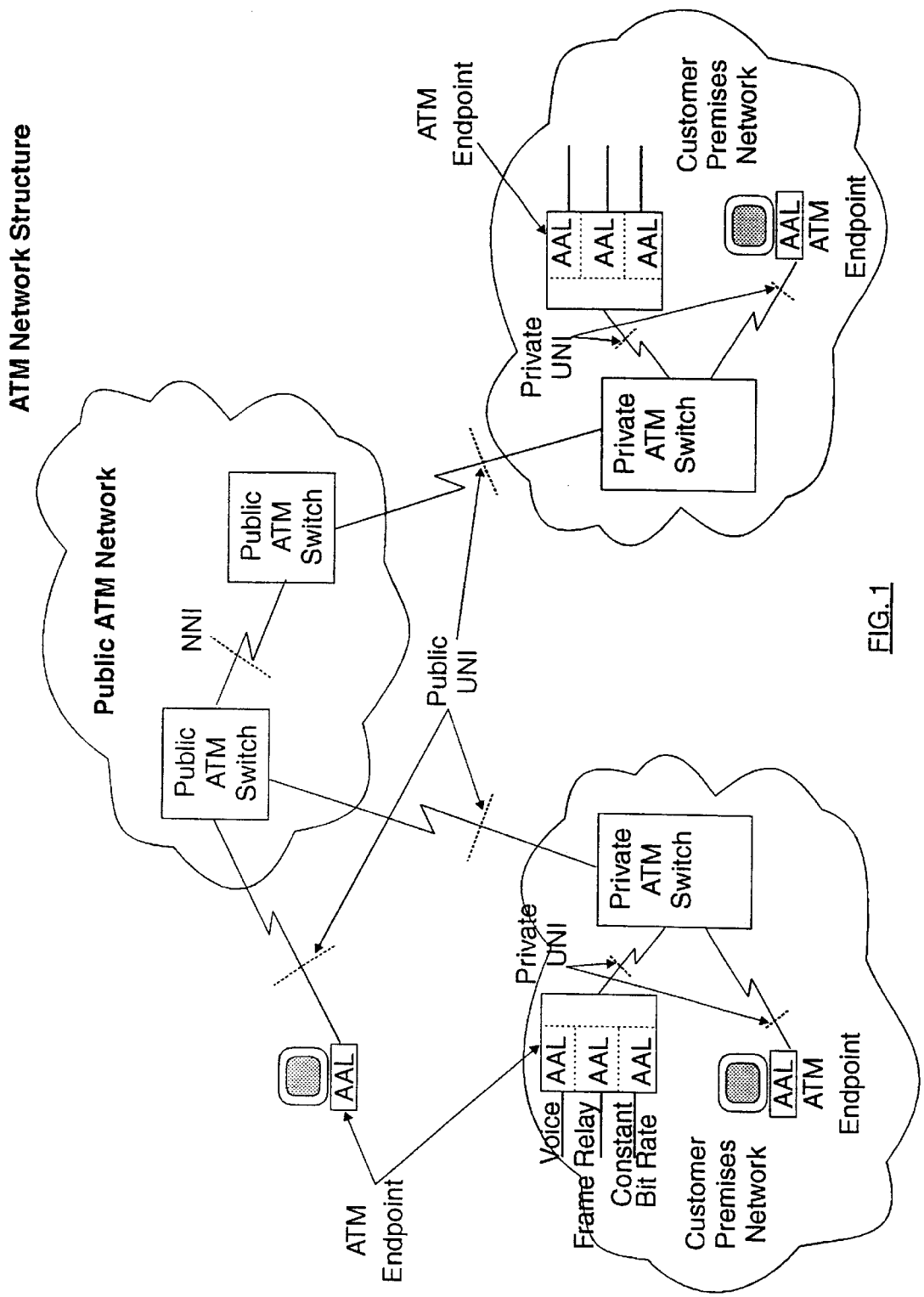
FIG. 1 shows an overview of an ATM network.

FIG. 1 shows three quite separate ATM networks—two private and one public. Private ATM networks are sometimes called "Customer Premises Networks". Four "ATM Switches" are shown in FIG. 1. These perform the backbone data transport within the ATM network. Several endpoints are illustrated. An ATM end-point is a piece of end user equipment that interfaces to an ATM network over a User Network Interface (UNI). Only end-points contain an ATM Adaptation Layer (AAL) function. Each UNI is defined by applicable standards. The public UNI is supports connection of end-user equipment to a public ATM network. The private UNI is for use within a single organization's premises or within a private network using lines leased from a public carrier. Within a network, different ATM switches are connected through a defined interface referred to as a Network to Network Interface (NNI)

The ITU (International Telecommunication Union) has defined four different classes of network traffic that need to be treated differently by an ATM network. These classes are designated Class A to Class D. The two classes of interest for purposes of the present invention are Class A (Constant Bit Rate or CBR) traffic and Class B (Variable Bit Rate or VBR) traffic.

Class A traffic is generated by constant rate voice and video applications characterized by a constant bit rate at source and destination, a timing relationship between source and destination, and a connection between end users and the service. A defined ATM Adaption Layer type 1 (AAL-1) is used to process Class A traffic.

Class B traffic is voice and video traffic that is basically isochronous at the level of end-user presentation, but which may be coded as variable-rate information during transit. A defined ATM Adaption Layer type 2 (AAL-2) processes the data stream similarly to AAL-1 but with the critical difference that a Class B data stream is variable in rate.

When ATM cells are transported through the network, those cells may take different amounts of time to reach the destination. This causes "delay jitter", which is dealt with at least in part by using a receiver buffer.

If data could be both transmitted and received using the same clock, there would be few problems with timing since the data stream would be transmitted and received at the same rate. However, asynchronous networks lack a common clock for controlling both transmission and reception of data. In asynchronous networks, the clocking information at a receiver must be derived from the received data itself.

A major challenge in AAL-1 and AAL-2 connections is performance of clock recovery to allow the data output frequency at a receiver to be matched to the data input frequency at the same receiver. Without clock recovery, if data is delivered to the network (even slightly) faster than it can be processed (transmitted to the other side of the network), output buffers will eventually run out of capacity and incoming data will have to be discarded. Conversely, if data is transmitted from the network faster than it is received, at some point the receiver will have nothing to transmit and the user data stream will be interrupted.

Figure 2:
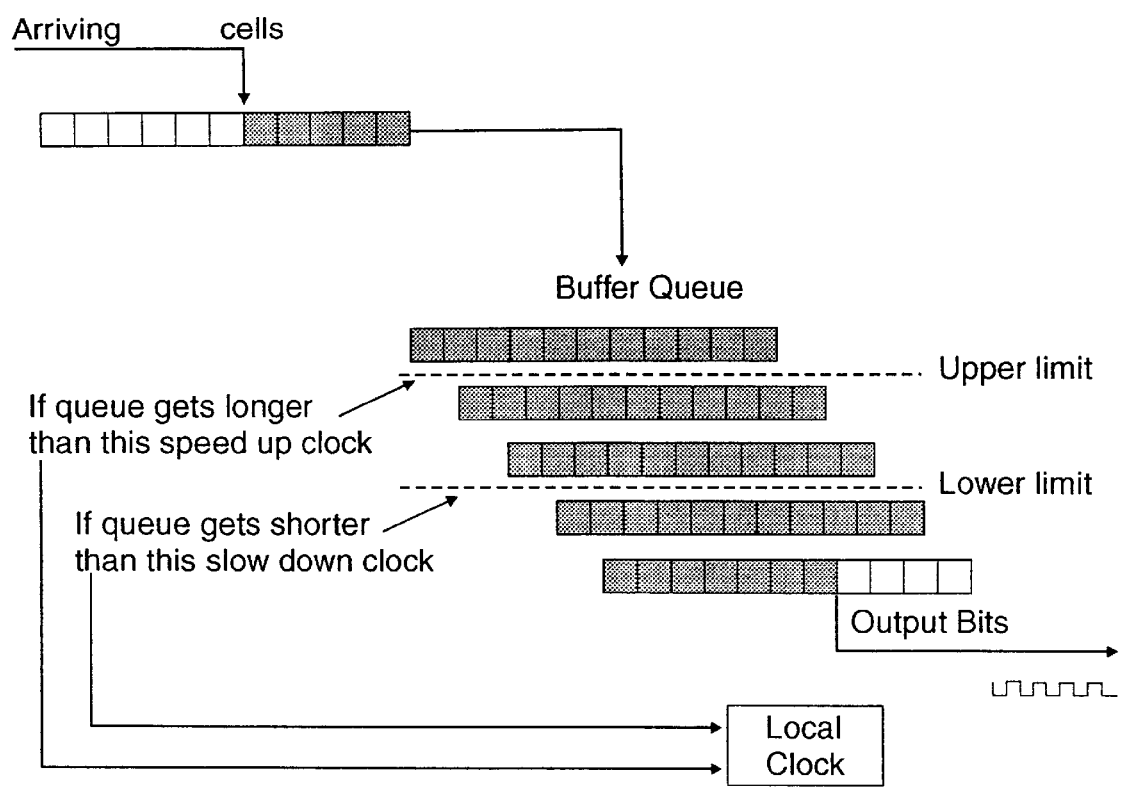
FIG. 2 illustrates the adaptive clock technique in general terms.

This means that the speed of the buffer output must closely match the speed of the buffer input. As mentioned earlier, one way to provide this speed matching is to use a Synchronous Residual Time Stamp (SRTS) while another way is to use Adaptive Clock Recovery (ACR), a generic representation of which is shown in FIG. 2. The present invention is an improvement in known Adaptive Clock Recovery techniques.

Figure 3:
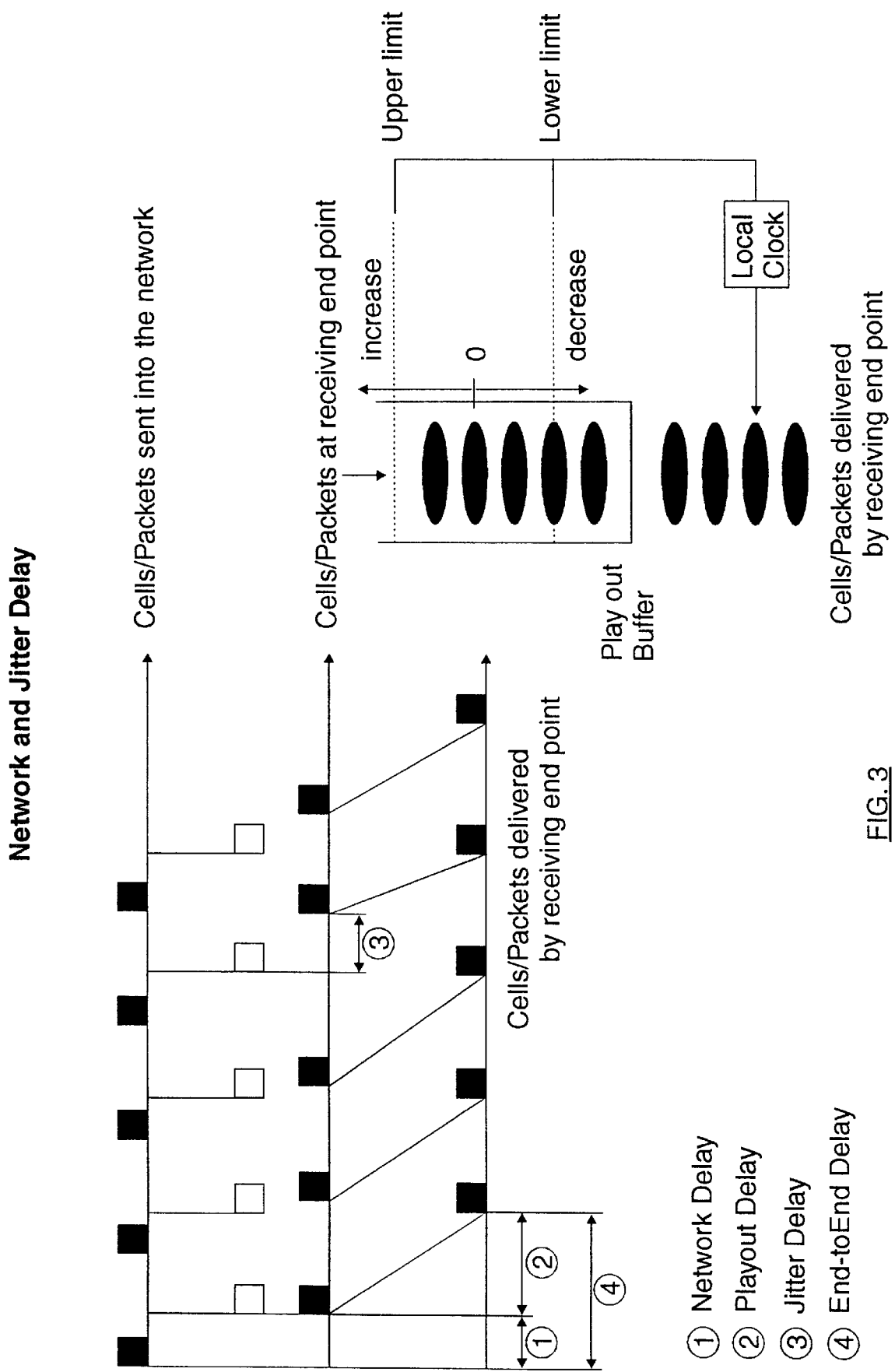
FIG. 3 shows network and jitter delay.

Adaptive Clock Recovery (ACR) method permits recovery and reproduction the frequency of a source clock but on the output side of a receiving buffer. The method is based on the fill level of the receiving or PlayOut Buffer. The PlayOut Buffer operates generally as a first-in first-out (FIFO) buffer in which data is stored as soon as it arrives at the receiver. The control of the Play out buffer is performed by periodically measuring the fill level. When the buffer tends to be full, the frequency of the local clock is increased to drain the PlayOut Buffer more rapidly. When the buffer tends to be empty, the frequency of the local clock is reduced to drain the PlayOut Buffer less rapidly. This is shown at a cell/packet level in FIG. 3. The ITU I.363.1 standard describes a PlayOut Buffer (POB mechanism adapted to CBR (Constant Bit Rate) and to VBR (Variable Bit Rate) traffic.

Figure 4:
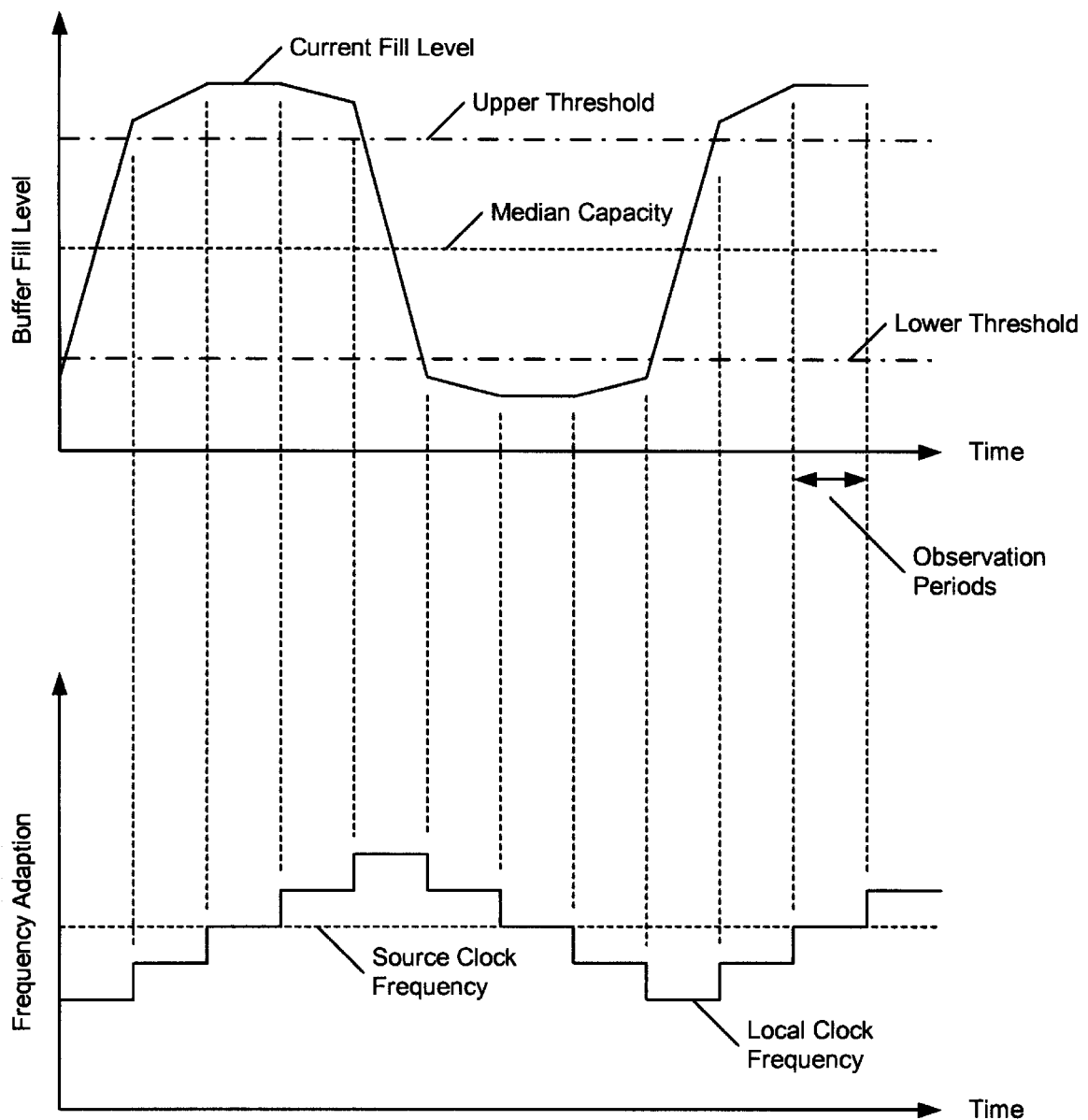
FIG. 4 is a chart of adaptive clock recovery according to prior art.

As shown in FIG. 4, the fill level of the buffer is regularly measured at predetermined e time intervals called observation periods ($T_{obs}$). When the fill level is higher than a predetermined upper limit ($B_{max}$), the frequency (bit rate) of the local clock $f_{local}$ is increased to drain the buffer. The period of the local clock $$\left(T_{local} = \frac{1}{f_{local}}\right)$$

is decreased by removing a given fraction of period ($\Delta T_{local}$) When the fill level is lower than a given limit ($B_{min}$), the frequency (bit rate) of the local clock $f_{local}$ is decreased. The period of the local clock $$\left(T_{local} = \frac{1}{f_{local}}\right)$$

is increased by adding a fraction of period.($\Delta T_{local}$).

At the receiving end the period of the local clock ($T_{local}$) is defined as a multiple of a reference period ($T_{ref}$). Thus, the given fraction of period added to or removed from the local clock period is often defined as equal to the reference period ($\Delta T_{local} = T_{ref}$). The object of the clock adaptation mechanism is to maintain the fill level of the PlayOut Buffer (POB) around the its medium position, and more particularly between two predefined limits $B_{max}$ and $B_{min}$) in order to prevent buffer overflow or underrun.

There is always some delay—packetization delay, admission delay, switching delay, queuing delay, transmission delay, propagation delay, etc. associated with traffic being transported through a network using switching equipment. For real time traffic, such as voice or video, the delay must be less than some maximum value while the variation in the delay from one cell to the next (jitter) must also be less than some maximum value.

Even when the frequency of the source clock ($f_{source}$) is stable (Constant Bit Rate), the frequency of the local clock ($f_{local}$) at the receiver is rarely exactly equal to the source clock frequency ($f_{source}$) Thus, in this case the maximum jitter that can be observed at the receiver on the local clock period ($T_{local}$) is equal to the reference period $T_{ref}$. To minimize this jitter, the reference period $T_{ref}$ must be small.

Especially when dealing with Variable Bit Rate (VBR) traffic at the source, the smaller the observation period ($T_{obs}$) is, the earlier the bit rate variation is detected. Furthermore, the more important the correction is, the more rapidly the local clock frequency is recovered. Thus, the fraction of period ($\Delta T_{local}$) (which is added or removed at every observation period ($T_{obs}$)) must be important enough for minimizing the time necessary to adapt the local clock at the receiver.

As shown in FIG. 4, a conventional clock adaptation mechanism does not operate continuously, but is triggered only when a buffer fill level falls outside the lower or upper thresholds. When the source clock frequency is greater than the local frequency ($f_{source} > f_{local}$), as soon as the fill level of the buffer exceeds the upper limit $B_{max}$, the local clock frequency $f_{local}$ is corrected at every observation period $T_{obs}$, by a fraction $$\left(\Delta F_{local} = \frac{1}{\Delta T_{local}}\right).$$

Under these conditions, the fill level of the buffer continues to increase until the local clock frequency is incremented to a value equal to the source clock frequency $$(f_{local} = f_{source}).$$

Even after the local clock frequency equals the source clock frequency, because the fill level of the buffer is still above the upper limit ($_{max}$), the adaptation mechanism continues to increment the local clock frequency $f_{local}$ which now exceeds the source clock frequency $f_{source}$. Once the local clock frequency exceeds the source clock frequency, the buffer fill level begins to decrease. When the fill level of the buffer falls below the upper limit ($B_{max}$), the adaptation mechanism stops adjusting the local clock.

Because the local clock is now faster than the source clock, the buffer will continue to empty faster than it is being refilled until the buffer fill level falls below the lower limit or threshold. When that happens the adaptive clock mechanism will again be triggered. This time, however, the local clock frequency will be decreased in increments. Eventually, the local clock frequency will fall below the source clock frequency, causing the fill level of the buffer to begin increasing. When the buffer fill level crosses the lower threshold, the adaptation mechanism ceases operation with the local clock frequency being "frozen" at a value greater than the source frequency.

There are specific problems with this approach. If rapid clock adaptation is considered more important, the adaptation process will tend to overreact, resulting in undesirable rapid oscillations and system instability. If system stability or frequency convergence is considered more important, clock adaptation will take longer, having negative effects on real time applications.

Figure 5:
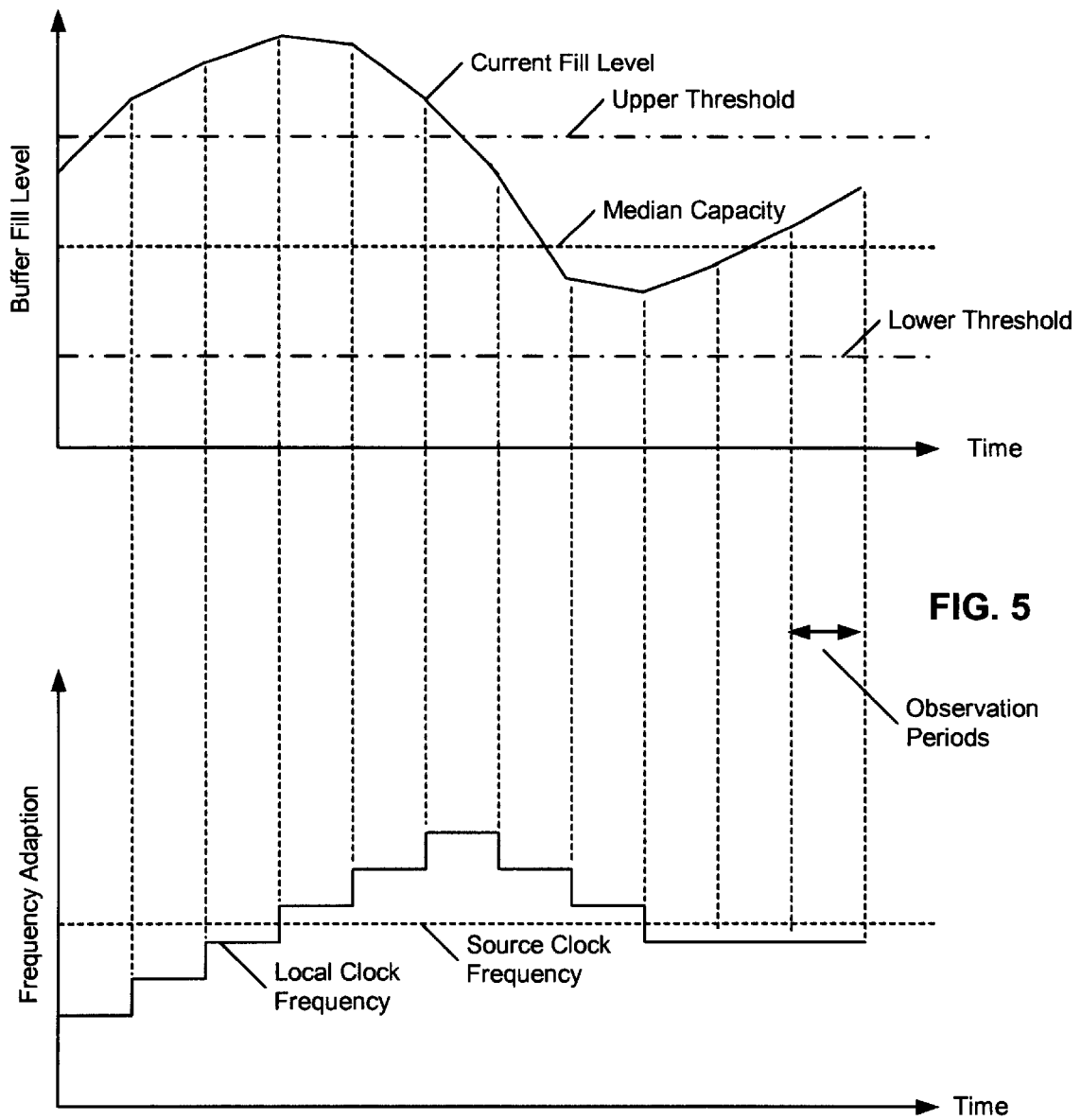
FIG. 5 is a chart of adaptive clock recovery according to the present invention.
Figure 6A:
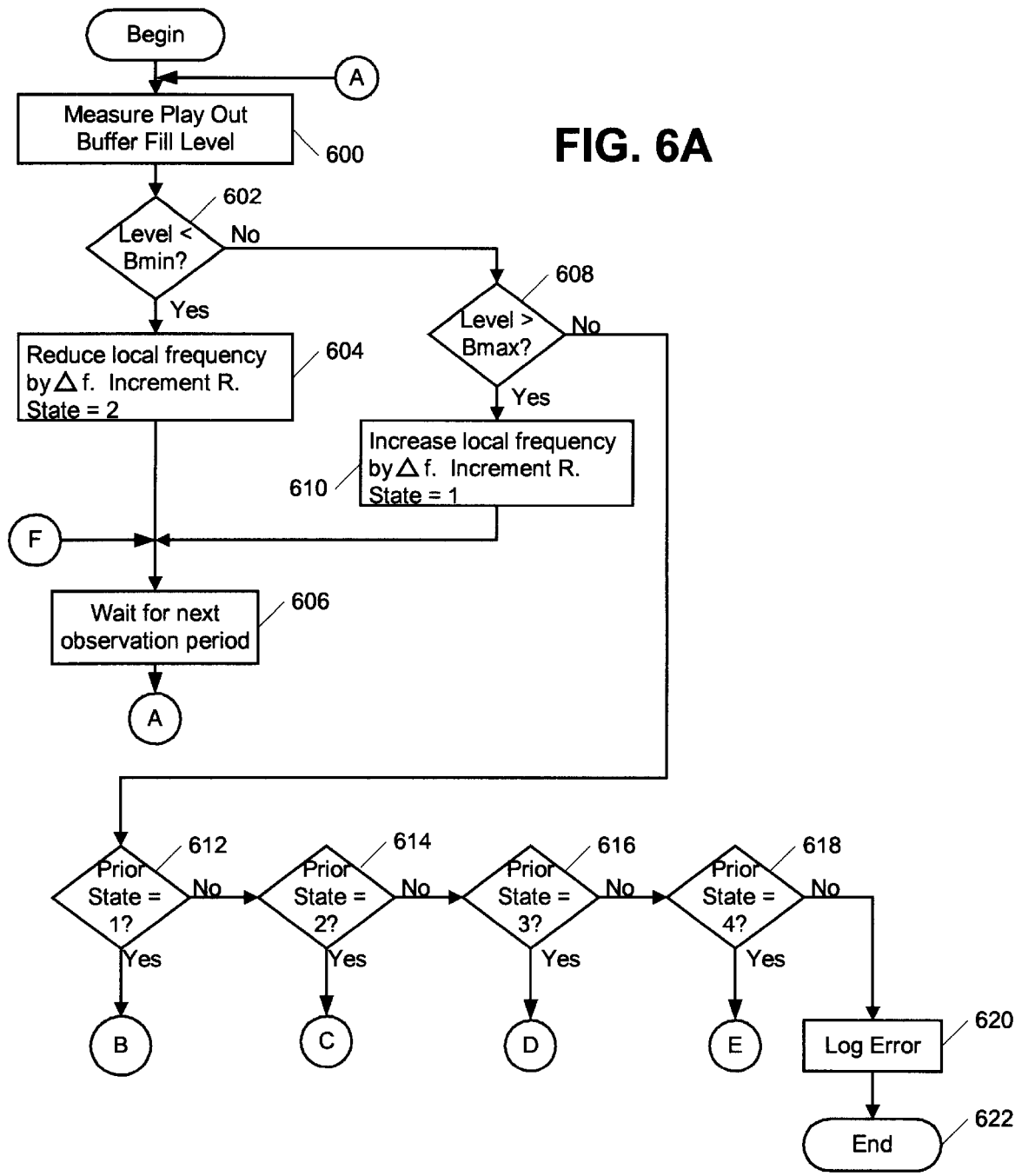
FIG. 6, consisting of FIGS. 6A and 6B, is a flow chart of the clock recovery mechanism according to the present invention.
Figure 6B:
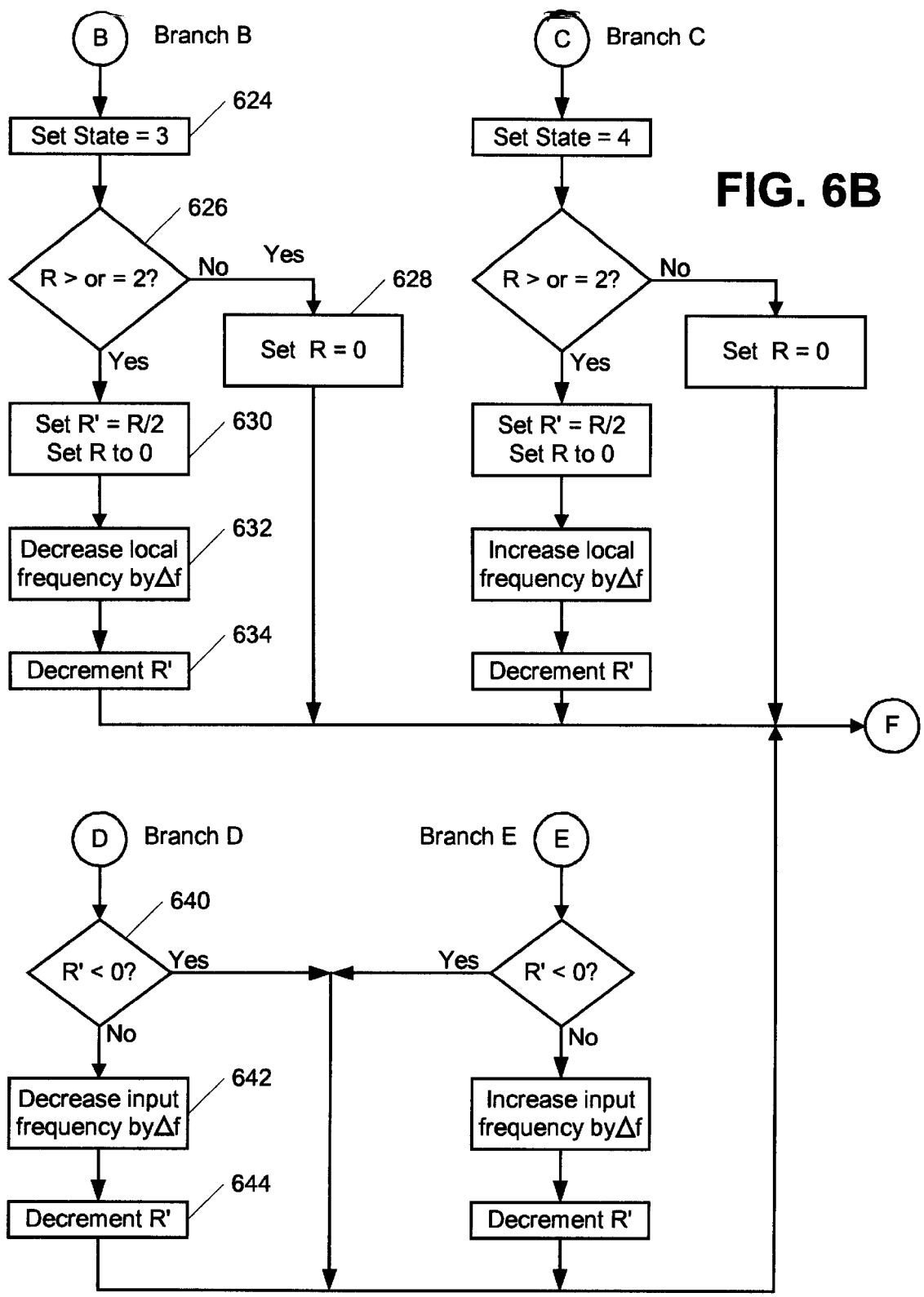

These problems are overcome by an improved process shown in flow chart form in FIG. 6. The effects of this process, described below, are illustrated in FIG. 5, including time graphs of the buffer fill level and changes in the local clock frequency.

The problems known to exist with the prior art approach are overcome by correcting local clock frequency not only when the fill level of the buffer overrun one of the two limits as described in prior art but also when the fill level finds itself within these two limits.

Referring to FIG. 6, the process is performed in the receiving end system. The process is initiated by a step 600 of measuring the current fill occupancy level of the receiver play out buffer. A test 602 is performed to determine whether the measured fill level is less than the lower threshold value. If the fill level is below the lower threshold, an operation 604 reduces the local clock frequency by a predetermined amount and increments a variable R representing the number of frequency adjustment operations performed during a current operating cycle. The device state is set equal to 2 as part of the same operation. The system then waits (operation 606) for the next observation period to be completed. Once that occurs, the program branches back to the input of operation 600.

If test 602 had shown that the buffer fill level was greater than the lower threshold, then another test 608 is performed to determine whether the buffer fill level is greater than the upper threshold. If the buffer fill level is found to be greater than the upper threshold, an operation 610 is initiated to increase the local clock frequency by a predetermined amount. As part of this same operation, the variable R is incremented and the system state is set to 1. Once these tasks are performed, the system waits for the next observation period.

If the results of both tests 602 and 608 are negative, then the buffer fill level must be between the lower threshold and the upper threshold. The system can, at least in theory, enter one of four parallel branches depending on the prior system state. A series of tests 612, 614, 616 and 618 are run to determine whether the prior system state was equal to 1, 2, 3, or 4, respectively. If the results of all of the tests are negative, an error condition must be logged (operation 620) since those are the only possible system states. The process ends abnormally at step 622 unless one of the four possible prior system states is detected during the series of tests.

A positive answer to test 612 means that the prior system state was equal to 1, which would normally occur only when the buffer fill level had been found to be greater than the upper threshold during the preceding observation period. The only condition under which test 612 should have a positive result is where the buffer fill level decreases from a value greater than the upper threshold to a value to less than the upper threshold during two successive observation periods. On a positive result from test 612, the program been branches to branch B having an initial operation 624 in which the system state is set equal to 3.

As noted earlier, the variable R is a count of the number of frequency adjustment operations that are performed during successive observation periods in which the buffer fill level is greater than the upper threshold. The variable R' represents the number of reverse correction operations that will be performed once the fill level drops below the upper threshold. The effect of the reverse correction operations will be to cause the local clock frequency to converge toward the input frequency.

To assure convergence, reverse corrections are preferably performed only if at least two correction operations bad been performed previously; that is, only if the value of the variable R is 2 or greater. If only a single frequency correction operation had been performed previously, then a reverse correction might "overshoot" the input frequency. To avoid this "overshoot", branch B includes a test 626 to make sure that R is greater than or equal to 2. If R is not 2 or more, no reverse corrections are performed. The variable R is initialized to 0 in an operation 628 and the system waits for the next observation period to be completed.

Assuming R is found to be greater than or equal to 2 in test 626, then a following operation 630 establishes a variable R' by reducing the R value by a predetermined factor. In a preferred embodiment of the invention, R' is set equal to R/2. Once the variable R' is established, the variable R is reset to 0. The reverse correction operation requires that the local clock frequency be decremented in an operation 632 after the fill level drops below the upper threshold. The count R' is decremented by one in an operation 634 before the program branches to the input of operation 606 to wait for the end of the next observation period.

Once branch B operations are performed at the end of an observation period, the system state=3 at the end of the next observation period. Assuming the buffer fill level is still below the upper threshold at the end of the next observation period, tests 612 and 614 will have negative results while test 616 will have a positive result. The program will branch to a branch "D" having an operation 640, which tests whether the variable R' is <0. If the variable R' is found to be <0, no further reverse correction operations are performed. If, however, the variable is still >0 at the time of test 640, the local clock frequency will be again decreased by a predetermined amount in an operation 642, causing it to converge further towards the source frequency. The variable R' is decremented in an operation 644.

The description above assumes that the buffer fill level transitions from a value greater than the upper threshold level to a value less than that threshold but still greater than the lower threshold value. If the situation were actually that the buffer fill level had been below the lower threshold and had transitioned to a value greater than the lower threshold as a result of a series of local frequency reductions resulting from operations 602 and 604, a similar series of reverse corrections would be performed, the difference being that the local frequency would be incremented during each of the reverse correction operations performed following a buffer refilling adjustment.

Where the buffer fill level transitions from a value less than the lower threshold to a value above that threshold (but still below the upper threshold), a test 614 may cause a program branch to a branch "C". The operations in branch "C" are similar to those described with reference to branch "B" but will cause the local clock frequency to be incremented, not decremented. Similarly, once the system state is set=4 by a branch "C" operation, a series of branch "E" operations may be performed one or more times to further increment the local clock frequency.

FIG. 5 is a chart showing buffer fill levels and local clock frequency adjustments which result from the process just described. It will be noted that the process causes the local frequency to converge more effectively toward the source frequency than the prior art process.

Figure 7:
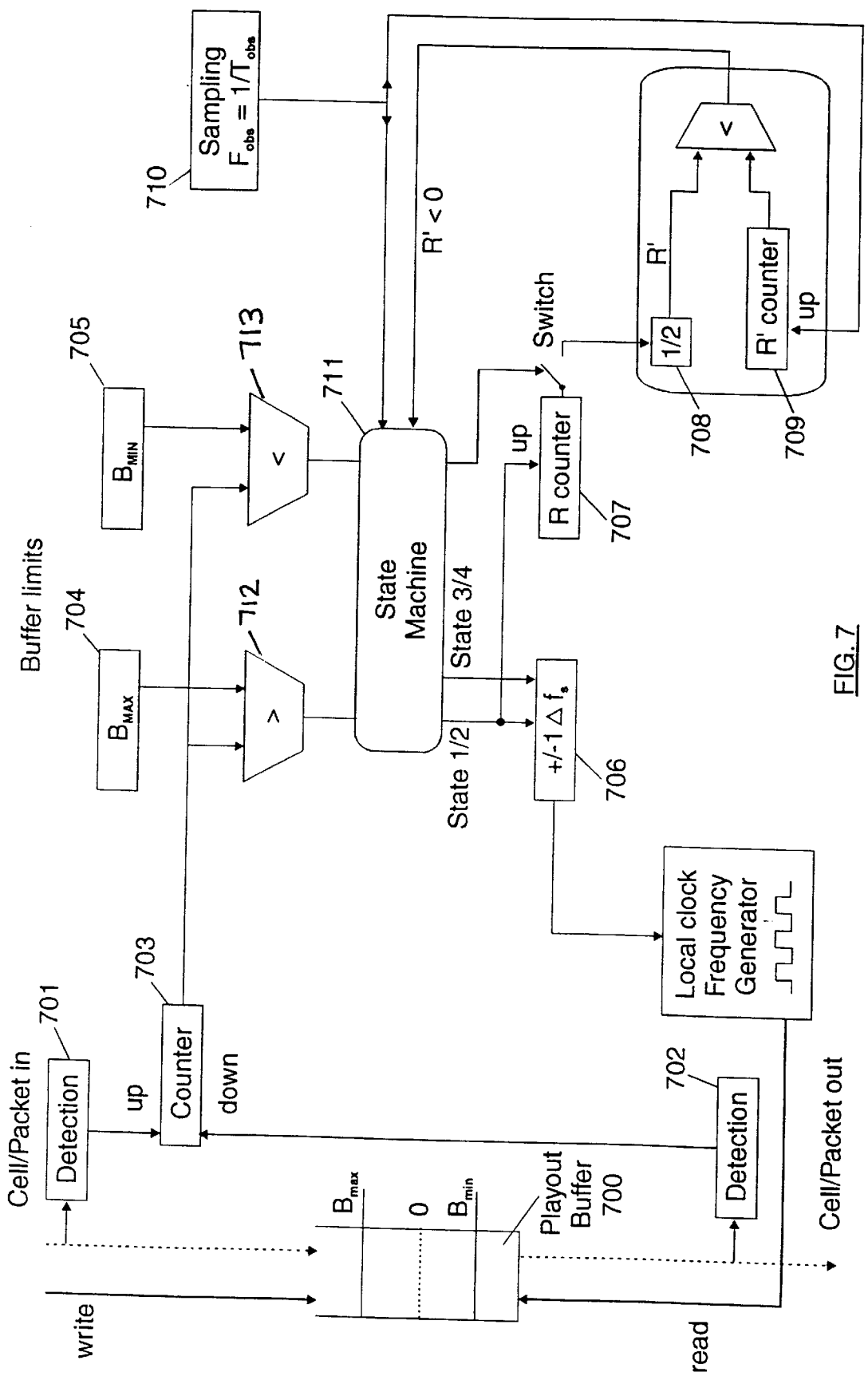
FIG. 7 is a view of the clock recovery system according to the present invention.
Figure 8:
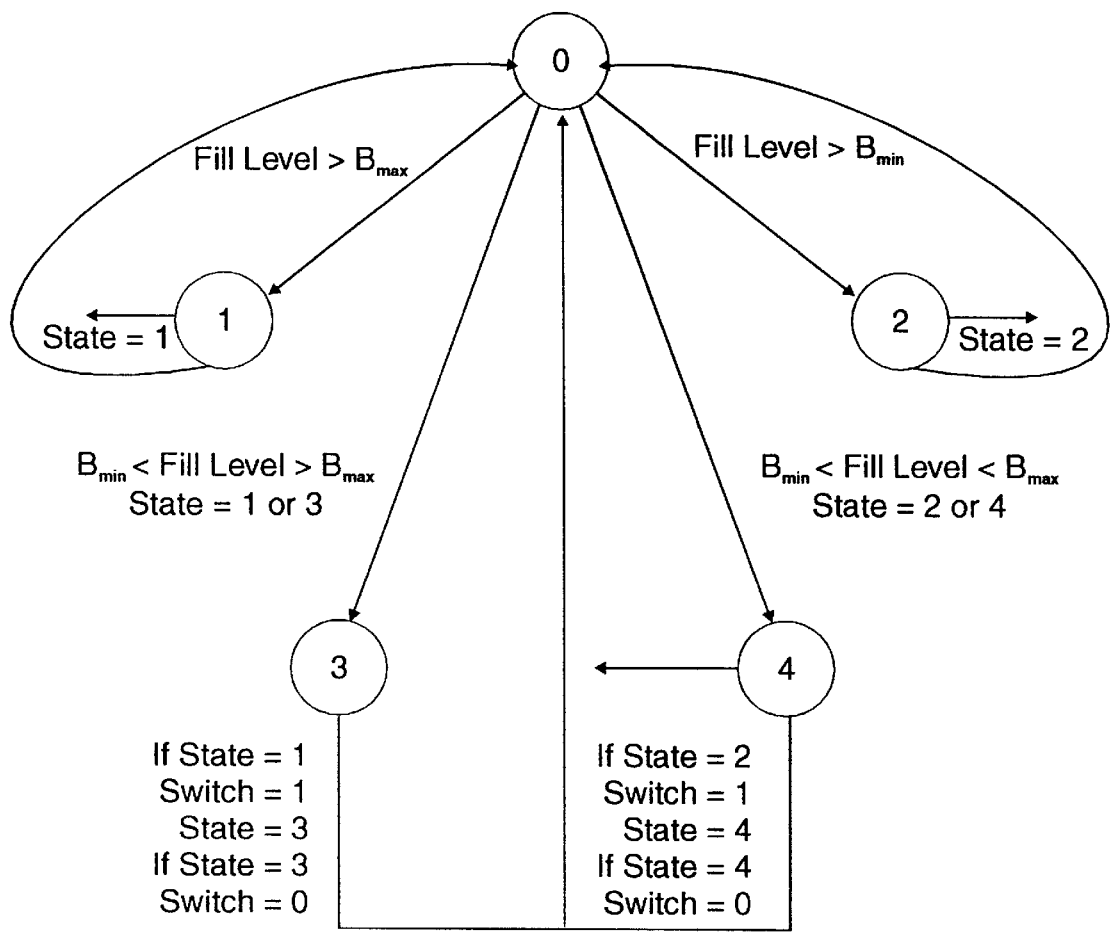
FIG. 8 is a detailed view of the state machine according to the present invention.

FIG. 7 is a schematic diagram of a system for performing the inventive process. Cells/packets are detected (701) in input of the buffer (700). Each cell added to the buffer increments a counter (703). Cells/packets are also detected (702) in output of the buffer (700). Each cell removed from the buffer decrements the same counter (703). The current count in counter 703 is a measure of the fill level of the buffer. A first compare circuit 712 is used to compare the fill level of the buffer to an upper buffer threshold recorded in a register (704). A second compare circuit 713 is used to compare the fill level to a lower buffer threshold recorded in a register (705). At the end of each observation period, the compare outputs are applied to state machine logic (711), a detailed state diagram for which is illustrated in FIG. 8. As noted earlier, the state machine sets the system state=1 if the buffer fill level is greater than the upper threshold and sets the system state=2 if the buffer fill level is less than the lower threshold.

The local clock frequency is adjusted (either incremented or decremented) in logic (706). At each observation period (710), an R counter (707) is incremented. As noted earlier, the variable R represents the number of consecutive corrections executed when the fill level is outside the upper and lower thresholds. When the fill level of the buffer returns to within the thresholds, the state machine logic sets the system state=3 if the upper threshold had been exceeded or to 4 if the lower threshold had been exceeded. The number of corrections previously executed is indicated by the contents of the R counter (707). To establish an initial value for R', the count R is divided by n in a divider circuit (708) with n=2 in a preferred embodiment. The variable R' represents the number of inverse corrections that must be executed once the fill level returns to a level between the upper and lower thresholds.

The invention has been described in detail both in flow chart format and system format. The state diagram of FIG. 8 may be consulted for a better understanding of the state transitions that occur.

While a preferred embodiment of the invention has been described above, variations and modifications in that preferred embodiment will occur to those skilled in the art. Therefore, it is intended that the appended claims shall be construed to include the preferred embodiment and all such variations and modifications as fall within the true spirit and scope of the invention.

What is claimed is:

1. A method for adapting an output clock frequency of a buffer to an input clock frequency to the buffer, said method comprising the steps of:

measuring a fill level of the buffer at the end of each of successive observation periods;

where the measured fill level exceeds a predetermined upper threshold level, adjusting the output clock frequency upwardly by a predetermined amount, and maintaining a count of the number of successive adjustment operations performed;

where the measured fill level is less than a predetermined lower threshold, adjusting the output clock frequency downwardly by a predetermined amount, and maintaining a count of the number of successive adjustment operations that are performed;

where the measured fill level had been outside a range of levels bounded by the upper threshold level and the lower threshold level but has returned to a level within said range, performing a number of reverse adjustments of the output clock frequency, the number of reverse adjustments being less than the number of successive adjustment operations previously performed.

2. A method as set forth in claim 1 wherein the the last step further comprises the steps of:

where the measured fill level had been greater than the predetermined upper threshold but has fallen to a value less than said threshold, decrementing the output clock frequency one or more times, the number of decrementing operations being less than the number of successive incrementing operations performed while the buffer fill level exceeded the upper threshold level; and where the measured fill level had been less than the predetermined lower threshold but has increased to a value greater than said threshold, incrementing the output clock frequency one or more times, the number of incrementing operations being less than the number of successive decrementing operations performed while the buffer fill level was less than the lower threshold level.

3. A method as set forth in either of claims 1 and 2 wherein the number of reverse adjustments is no greater than one half of the number of preceding successive adjustment operations.

4. A method for adapting an output clock frequency of a buffer to an input clock frequency to the buffer, said method comprising the steps of:

measuring a fill level of the buffer at the end of each of successive observation periods;

at the end of each observation period where the measured fill level exceeds a predetermined upper threshold level, adjusting the output clock frequency upwardly by a predetermined amount, and maintaining a count of the number of successive adjustment operations performed;

at the end of each observation period in which the measured fill level is found to be less than the upper threshold after having previously been greater than said threshold, adjusting the output clock frequency downwardly; and repeating the above step a number of times, the number being less that the number of successive adjustment operations that had been performed while the measured fill level was greater than the predetermined threshold.

* * * * *